United States Patent
Huang et al.

(10) Patent No.: US 11,618,822 B2
(45) Date of Patent: Apr. 4, 2023

(54) ORGANIC-INORGANIC HYBRID RESIN, COATING MATERIAL, AND COMPOSITE STRUCTURE

(71) Applicant: INDUSTRIAL TECHNOLOGY RESEARCH INSTITUTE, Hsinchu (TW)

(72) Inventors: Yuan-Chang Huang, Hsinchu (TW); Shu-Yun Chien, Hsinchu (TW); Ya-Tin Yu, New Taipei (TW); Wei-Cheng Tang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 339 days.

(21) Appl. No.: 17/138,397

(22) Filed: Dec. 30, 2020

(65) Prior Publication Data

US 2022/0177702 A1 Jun. 9, 2022

(30) Foreign Application Priority Data

Dec. 9, 2020 (TW) .................. 109143428

(51) Int. Cl.
*C08L 83/04* (2006.01)
*C09D 183/04* (2006.01)
*C08G 77/20* (2006.01)

(52) U.S. Cl.
CPC .............. *C08L 83/04* (2013.01); *C08G 77/20* (2013.01); *C09D 183/04* (2013.01)

(58) Field of Classification Search
CPC ........ C08L 83/04; C08G 77/20; C09D 183/04
See application file for complete search history.

(56) References Cited

U.S. PATENT DOCUMENTS

| | | | | |
|---|---|---|---|---|
| 5,230,962 A | * | 7/1993 | Stephenson | C09D 143/04 525/445 |
| 5,532,027 A | | 7/1996 | Nordstrom et al. | |
| 6,713,586 B2 | | 3/2004 | Greene | |
| 8,846,827 B2 | | 9/2014 | Mowrer | |
| 10,457,837 B2 | | 10/2019 | Huang et al. | |
| 2014/0174321 A1 | * | 6/2014 | Huang | C08K 5/5425 427/430.1 |
| 2018/0148600 A1 | | 5/2018 | Murugesan et al. | |
| 2018/0179416 A1 | * | 6/2018 | Huang | C08G 77/445 |
| 2019/0233654 A1 | | 8/2019 | Jeong et al. | |
| 2020/0223985 A1 | | 7/2020 | Mehra et al. | |

FOREIGN PATENT DOCUMENTS

| | | |
|---|---|---|
| CN | 1587299 A | 3/2005 |
| CN | 1675293 A | 9/2005 |
| CN | 102344726 A | 2/2012 |
| CN | 103897586 A | 7/2014 |
| CN | 106009006 A * | 10/2016 |
| CN | 106318198 A | 1/2017 |
| CN | 108250956 A | 7/2018 |
| CN | 111234091 A | 6/2020 |
| CN | 108264640 B | 7/2020 |
| JP | 6135860 B2 | 5/2017 |
| JP | 2020-164583 A | 10/2020 |
| TW | 201734159 A | 10/2017 |
| TW | 201823392 A | 7/2018 |
| WO | WO 2018/124826 A1 | 7/2018 |

OTHER PUBLICATIONS

Chinese Office Action and Search Report dated Dec. 14, 2022 for Application No. 202110440652.7.
Antic et al., "Synthesis and characterization of thermoplastic poly(ester-siloxane)s," Polymer International, vol. 50, 2001, pp. 1201-1208.
El-Bindary et al., "Synthesis and characterization of hyperbranched silane-modified alkyd as a polymer for environmentally friendly low VOC polyurethane coatings," Pigment & Resin Technology, 2019, 8 pages.
Jung et al., "Synthesis of acetoxyphenyl- and hydroxyphenyl-terminated polyfunctional T8, T10, T12 silsesquioxanes and initial studies on their use in the formation of highly crosslinked polyesters," Appl. Organometal. Chem., vol. 27, 2013, pp. 666-672.
Lucia et al., "A Direct Silanization Protcol for the Dialdehyde Cellulose," Molecules, vol. 25, No. 2458, 2020, pp. 1-12.
Zaharieva et al., "SiO2/polyester hybrid for immobilization of Ru(II) complex as optical gas-phase oxygen sensor," J. Mater. Chem., vol. 21, 2011, pp. 4893-4903.
Taiwanese Office Action and Search Report for Taiwanese Application No. 109143428, dated Aug. 20, 2021.

* cited by examiner

Primary Examiner — James C Goloboy
(74) Attorney, Agent, or Firm — Birch, Stewart, Kolasch & Birch, LLP

(57) ABSTRACT

An organic-inorganic hybrid resin is formed by reacting a polyol organic resin with a polysilsesquioxane polymer. The organic-inorganic hybrid resin has $T^0$, $T^1$, $T^2$, and $T^3$ signals of $^{29}$Si-NMR, wherein a ratio of the sum of 3 times the integral value of $T^0$ signal and 2 times the integral value of $T^1$ signal and the integral value of $T^2$ signal and the integral value of $T^3$ signal $((3T^0+2T^1+T^2)/T^3)$ is from 0.3 to 1.2, wherein the $T^0$ signal range is 35 ppm to 40 ppm, the $T^1$ signal range is 48 ppm to 53 ppm, the $T^2$ signal range is 55 ppm to 62 ppm, and the $T^3$ signal range is 63 ppm to 72 ppm.

12 Claims, No Drawings

ORGANIC-INORGANIC HYBRID RESIN, COATING MATERIAL, AND COMPOSITE STRUCTURE

CROSS REFERENCE TO RELATED APPLICATIONS

The present application is based on, and claims priority from, Taiwan Application Serial Number 109143428, filed on Dec. 9, 2020, the disclosure of which is hereby incorporated by reference herein in its entirety.

TECHNICAL FIELD

The technical field relates to an organic-inorganic hybrid resin.

BACKGROUND

The recent trend of environmental protection has two important indicators: volatile organic compounds (VOC) in coating materials are reduced, and the weather resistance of coating layers are increased. To improve weather resistant of coating layers, more inorganic siloxane polymer should be added to the hybrid material. To decrease the VOC in coating materials, the amount of solvent in the coating material should be lowered. Both of these methods will increase the amount of the inorganic siloxane polymer in the coating material, thereby increasing the content of the reactive functional groups (e.g. silanol group Si—OH and silanoxy group Si—OR) in the coating material. The reactive functional groups in a high concentration will continue to have a condensation reaction at room temperature, causing the storage stability of the coating material to be poor. Accordingly, a novel coating material composition is called for to address the above issues.

SUMMARY

One embodiment of the disclosure provides an organic-inorganic hybrid resin, being formed by reacting a polyol organic resin and a polysilsesquioxane polymer, wherein the organic-inorganic hybrid resin has $T^0$, $T^1$, $T^2$, and $T^3$ signals of $^{29}$Si-NMR, wherein a ratio of the sum of 3 times the integral value of $T^0$ signal and 2 times the integral value of $T^1$ signal and the integral value of $T^2$ signal to the integral value of $T^3$ signal $((3T^0+2T^1+T^2)/T^3)$ is from 0.3 to 1.2, wherein the $T^0$ signal range is 35 ppm to 40 ppm; the $T^1$ signal range is 48 ppm to 53 ppm; the $T^2$ signal range is 55 ppm to 62 ppm; and the $T^3$ signal range is 63 ppm to 72 ppm.

One embodiment of the disclosure provides a coating material, including 1 part by weight of an organic-inorganic hybrid resin and 0.2 to 1.5 parts by weight of solvent, wherein the organic-inorganic hybrid resin is formed by reacting a polyol organic resin with a polysilsesquioxane polymer, wherein the organic-inorganic hybrid resin has $T^0$, $T^1$, $T^2$, and $T^3$ signals of $^{29}$Si-NMR, wherein the ratio of the sum of 3 times the integral value of $T^0$ signal and 2 times the integral value of $T^1$ signal and the integral value of $T^2$ signal to the integral value of $T^3$ signal $((3T^0+2T^1+T^2)/T^3)$ is from 0.3 to 1.2, wherein the $T^0$ signal range is 35 ppm to 40 ppm; the $T^1$ signal range is 48 ppm to 53 ppm; the $T^2$ signal range is 55 ppm to 62 ppm; and the $T^3$ signal range is 63 ppm to 72 ppm.

One embodiment of the disclosure provides a composite structure, including a metal substrate; and a coating layer disposed on the metal substrate, wherein the coating layer is formed by curing a coating material, the coating material includes an organic-inorganic hybrid resin, and the organic-inorganic hybrid resin is formed by reacting a polyol organic resin and a polysilsesquioxane polymer, wherein the organic-inorganic hybrid resin has $T^0$, $T^1$, $T^2$, and $T^3$ signals of $^{29}$Si-NMR, wherein the ratio of the sum of 3 times the integral value of $T^0$ signal and 2 times the integral value of $T^1$ signal and the integral value of $T^2$ signal to the integral value of $T^3$ signal $((3T^0+2T^1+T^2)/T^3)$ is from 0.3 to 1.2, wherein the $T^0$ signal range is 35 ppm to 40 ppm; the $T^1$ signal range is 48 ppm to 53 ppm; the $T^2$ signal range is 55 ppm to 62 ppm; and the $T^3$ signal range is 63 ppm to 72 ppm.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides an organic-inorganic hybrid resin, being formed by reacting a polyol organic resin and a polysilsesquioxane polymer. In some embodiments, the polysilsesquioxane polymer can be formed by reacting (a) polysilsesquioxane and (b) silane. In some embodiments, (a) polysilsesquioxane can be formed by polymerizing $Si(R^1)_3(R^2)$, in which each $R^1$ is independently hydroxyl group or $C_{1-8}$ alkoxy group, and $R^2$ is $C_{1-12}$ alkyl group or $C_{6-12}$ aromatic group. In some embodiments, —$Si(R^1)_3(R^2)$ can be methyltrimethoxysilane, methyltriethoxysilane, ethyltriethoxysilane, phenyltriethoxysilane, phenyltrimethoxysilane, or a combination thereof. In some embodiments, $Si(R^1)_3(R^2)$ can further polymerize with tetraalkoxysilane (e.g. tetramethoxysilane, tetraethoxysilane, another tetraalkoxysilane, or a combination thereof) to form (a) polysilsesquioxane. In one embodiment, (a) polysilsesquioxane has a weight average molecular weight (Mw) of 500 to 15000. If the weight average molecular weight of (a) polysilsesquioxane is too low, the hardness of the coating layer will be insufficient. If the weight average molecular weight of (a) polysilsesquioxane is too high, the stability of the coating material will be insufficient, and the coating material solution will be gelled at room temperature.

In one embodiment, (b) silane may have a formula of $Si(R^3)_2(R^4)(R^5)$, in which each $R^3$ is independently hydroxyl group or $C_{1-8}$ alkoxy group; $R^4$ is hydroxyl group, $C_{1-8}$ alkyl group, or $C_{1-8}$ alkoxy group; and $R^5$ is $C_{3-12}$ epoxy group, $C_{3-12}$ acrylate group, $C_{3-12}$ alkylacrylate group, $C_{3-12}$ aminoalkyl group, $C_{3-12}$ isocyanate alkyl group, $C_{3-12}$ alkyl carboxylic acid group, $C_{3-12}$ haloalkyl group, $C_{3-12}$ thiol alkyl group, or $C_{3-12}$ alkenyl group. In one embodiment, (b) silane can be 2-(3,4-epoxycyclohexyl)-ethyltrimethoxysilane, 3-glycidoxypropyltrimethoxysilane, 3-glycidoxypropyl methyldiethoxysilane, 3-glycidoxypropyl triethoxysilane, 3-methacryloxypropyl methyldimethoxysilane, 3-methacryloxypropyl trimethoxysilane, 3-methacryloxypropyl methyldiethoxysilane, 3-methacryloxypropyl triethoxysilane, N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, N-phenyl-3-aminopropyltrimethoxysilane, 3-ureidopropyltriethoxysilane, 3-isocyanatepropyltriethoxysilane, 3-chloropropyltrimethoxysilane, 1H,1H,2H,2H-perfluorooctyltriethoxysilane, (heptadecafluoro-1,1,2,2-tetrahydrodecyl) triethoxysilane, 3-mercaptopropyltrimethoxysilane, 3-mercaptopropylmethyldimethoxysilane, bis(triethoxysilylpropyl)tetrasulfide, or 3-acryloxypropyl trimethoxysilane.

In some embodiments, (a) polysilsesquioxane and (b) silane may have a weight ratio of 1:10 to 10:1. If the amount of (b) silane is too low (or even without (b) silane), the coating layer will be hard, brittle, and easily cracked. If the amount of (b) silane is too high, the organic content will be too high, and the mechanical properties (e.g. hardness) of the coating layer will be lowered. In one embodiment, the polysilsesquioxane polymer may have a weight average molecular weight of 1000 to 20000. If the weight average molecular weight of the polysilsesquioxane polymer is too low, the hardness of the coating layer will be insufficient. If the weight average molecular weight of the polysilsesquioxane polymer is too high, the stability of the coating material will be insufficient, and the coating material solution will be gelled at room temperature.

It should be noted that the polysilsesquioxane polymer for the embodiments is not limited to the polysilsesquioxane polymer prepared by the above method. For example, a commercially available polysilsesquioxane polymer can be directly adopted, as long as it has appropriate content of alkoxy group or hydroxyl group of (e.g. silicon spectrum signal integral value ratio $(3T^0+2T^1+T^2)/T^3$) to react with hydroxyl groups of the polyol organic resin. For example, in the silicon spectrum of the commercially available polysilsesquioxane polymer, the signal integral value ratio $(3T^0+2T^1+T^2)/T^3$ can be 1.5 to 10. If the ratio $(3T^0+2T^1+T^2)/T^3$ is too low, the polysilsesquioxane polymer cannot efficiently react with the polyol organic resin. If the ratio $(3T^0+2T^1+T^2)/T^3$ is too high, the molecular weight of the formed organic-inorganic hybrid resin will be too low. In the silicon spectrum, the $T^0$ signal range is 35 ppm to 40 ppm, the $T^1$ signal range is 48 ppm to 53 ppm, the $T^2$ signal range is 55 ppm to 62 ppm, and the $T^3$ signal range is 63 ppm to 72 ppm. The $T^0$ signal corresponds to Si of R—Si(OX)$_3$, in which R is the substituent group (such as alkyl group) directly bonded to Si, and X is H or alkyl group. The $T^1$ signal corresponds to Si of R—Si(OX)$_2$(OSi'Y$_3$), in which R is the substituent group (such as alkyl group) directly bonded to Si, X is H or alkyl group, Si' is another silicon atom, and Y is the substituent group bonded to Si'. The $T^2$ signal corresponds to Si of R—Si(OX)(OSi'Y$_3$)$_2$, in which R is the substituent group (such as alkyl group) directly bonded to Si, X is H or alkyl group, Si' is another silicon atom, and Y is the substituent group bonded to Si'. The $T^3$ signal corresponds to Si of R—Si(OSi'Y$_3$)$_3$, in which R is the substituent group (such as alkyl group) directly bonded to Si, Si' is another silicon atom, and Y is the substituent group bonded to Si'.

The silicon spectrum of the organic-inorganic hybrid resin has the $T^0$, $T^1$, $T^2$, and $T^3$ signals, and the ratio of the sum of 3 times the integral value of $T^0$ signal and 2 times the integral value of $T^1$ signal and the integral value of $T^2$ signal to the integral value of $T^3$ signal $((3T^0+2T^1+T^2)/T^3)$ is from 0.3 to 1.2, such as 0.7 to 0.95. The definitions of $T^0$, $T^1$, $T^2$, and $T^3$ are described above. If the ratio $(3T^0+2T^1+T^2)/T^3$ of the organic-inorganic hybrid resin is too low, the molecular weight of the organic-inorganic hybrid resin will be too large. If the ratio $(3T^0+2T^1+T^2)/T^3$ of the organic-inorganic hybrid resin is too high, the organic-inorganic hybrid resin will be unstable and not suitable for long-time storage.

In some embodiments, the polysilsesquioxane polymer and the polyol organic resin have a weight ratio of 12:1 to 0.2:1. If the amount of the polyol organic resin is too low, the coating layer will be hard and brittle or has an insufficient alkaline resistance. If the amount of the polyol organic resin is too high, the weather resistance of the coating layer will be poor. In some embodiments, the polyol organic resin includes acrylic polyol resin, polyester polyol resin, polycarbonate polyol resin, or polyether polyol resin. For example, the polyol organic resin may have a weight average molecular weight of 1000 to 20000. If the weight average molecular weight of the polyol organic resin is too low, the coating layer will be hard and brittle. If the weight average molecular weight of the polyol organic resin is too high, the weather resistance of the coating layer will be lowered, because the chemical bonding cannot be formed between the organic and inorganic substances when the molecular weight of organic substance is too high.

In some embodiments, the organic-inorganic hybrid resin has a weight average molecular weight of 3000 to 30000, or 4500 to 10000. If the weight average molecular weight of the organic-inorganic hybrid resin is too low, the coating material cannot form a film. If the weight average molecular weight of the organic-inorganic hybrid resin is too high, the coating material will be too viscous to be used in coating smoothly.

In some embodiments, during the process of reacting the polysilsesquioxane polymer and the polyol organic resin, with the aforementioned ratio, to form the organic-inorganic hybrid resin, the reaction should be simultaneously distilled to remove some solvent in the reaction to avoid gelation. On the other hand, if the polysilsesquioxane polymer and the polyol organic resin are only mixed rather than reacted, the stability of the coating material of the mixture will be insufficient.

One embodiment of the disclosure provides a coating material, including 1 part of the described organic-inorganic hybrid resin and 0.2 to 1.5 parts by weight of solvent. If the amount of the solvent is too low, the stability of the coating material will be insufficient. If the amount of the solvent is too high, the VOC will be too high or the viscosity of the coating material will be too low to directly coat the coating material. In some embodiments, the solvent includes ethyl acetate, butyl acetate, ethanol, isopropanol, butanol, methyl isobutyl ketone, acetone, toluene, xylene, aromatic naphtha, tetrahydrofuran, cyclohexane, cyclohexanone, another suitable solvent, or a combination thereof. The solvent can be a solvent for synthesizing the organic-inorganic hybrid resin and a side product (e.g. methanol or ethanol) from the synthesis. In some embodiments, another solvent can be further added to the coating material. In some embodiments, the coating material may further include crosslinker, inorganic filler, or a combination thereof. For example, the crosslinker can be isocyanate, amino resin, carbodiimide, maleimide, perimino resin, hexamethylol melamine, siloxane, titanoxane, aluminoxane, another suitable crosslinker, or a combination thereof. In some embodiments, the inorganic filler can be titania, silica, calcium carbonate, mica, alumina, talc, barium sulfate, another suitable inorganic filler, or a combination thereof.

One embodiment of the disclosure provides a composite structure, which includes a metal substrate and a coating layer disposed on the metal substrate. The coating layer can be formed by curing the described coating material. For example, the metal substrate can be steel or another suitable metal material. In some embodiments, the coating layer has a thickness of 5 micrometers to 100 micrometers. If the coating layer is too thin, it will lack effect of weather resistance. If the coating layer is too thick, it will be easily cracked and increase the cost. In some embodiments, a metal coating can be further disposed on the metal substrate, such as disposed between the metal substrate and the coating layer. In some embodiments, the metal coating can be zinc, aluminum zinc, magnesium aluminum zinc, magnesium aluminum zinc nickel, or a combination thereof. In addition, another layer such as primer can be further disposed between the metal substrate (or metal coating) and the coating layer to achieve another requirement such as anti-corrosion.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity.

EXAMPLES

In the following Examples, the stability of the organic-inorganic hybrid resin was observed to determine its appearance be clear (stable) or have suspended matter or even gel (unstable) after standing at room temperature for 14 days. The Si spectrum ($^{29}$Si-NMR) of the organic-inorganic hybrid resin was analyzed to calculate the ratio $(3T^0+2T^1+T^2)/T^3$ (the molar ratio of Si—OH or Si—OR in the organic-inorganic hybrid resin). The molecular weight of the organic-inorganic hybrid resin was measured by gel permeation chromatograph (GPC) with polystyrene as molecular weight calculation standard. The solid content (non-volatile content) of the organic-inorganic hybrid resin was measured according to the standard CNS10880-1. The weather resistance of the coating layer was measured according to the second cyclic method of the standard ASTM G154. The brightness of 60 degrees of the coating layer before and after the weather resistance test was measured according to the standard CNS15200-4-6. The brightness retention rate was defined as (the brightness after the weather resistance test/the brightness before the weather resistance test)×100%.

Example 1

0.8 g of HCl, 12 g of de-ionized water, 45 g of methyl trimethoxysilane (MTMS) were evenly mixed and reacted at 60° C. for 3 hours to obtain a solution of polysilsesquioxane. 30 g of the polysilsesquioxane and 30 g of 3-methacryloxy propyl trimethoxysilane (MPMS) were then mixed and reacted at 60° C. for 2 hours to obtain polysilsesquioxane polymer (having a molecular weight higher than that of the polysilsesquioxane).

40 g of the polysilsesquioxane polymer, 5 g of acrylic polyol resin (ETERAC 7355-S-80, commercially available from Eternal Materials Co., Ltd.), and 0.15 g of catalyst (dibutyltin dilaurate, DBTDL) were reacted at 80° C. for 2 hours and simultaneously distilled to remove some solvent, thereby obtaining an organic-inorganic hybrid resin with a solid content of 51.5%, a silicon spectrum signal integral value ratio $(3T^0+2T^1+T^2)/T^3$ of 0.84, a weight average molecular weight of 8034, and an excellent stability after standing at room temperature for 14 days.

2 g of crosslinker (Allnex cymel 1158) and 2 g of TiO$_2$ (Chemours R706) were added to 11 g of the organic-inorganic hybrid resin and mixed. The mixture was coated onto a galvanized steel plate, and then dried at 240° C. for 10 minutes to obtain a coating layer. The brightness retention rate of the coating layer after the weather resistance test (600 hours) was >85%.

Example 2

40 g of the polysilsesquioxane polymer synthesized from Example 1, 5 g of acrylic polyol resin (ETERAC 7355-S-80), and 0.15 g of catalyst (DBTDL) were reacted at 80° C. for 5 hours and simultaneously distilled to remove some solvent, thereby obtaining an organic-inorganic hybrid resin with a solid content of 77.4%, a silicon spectrum signal integral value ratio $(3T^0+2T^1+T^2)/T^3$ of 0.92, a weight average molecular weight of 12395, and an excellent stability after standing at room temperature for 14 days.

2 g of crosslinker (Allnex cymel 1158) and 2 g of TiO$_2$ (Chemours R706) were added to 11 g of the organic-inorganic hybrid resin and mixed. The mixture was coated onto a galvanized steel plate, and then dried at 240° C. for 10 minutes to obtain a coating layer. The brightness retention rate of the coating layer after the weather resistance test (600 hours) was >85%.

Example 3

40 g of the polysilsesquioxane polymer synthesized from Example 1, 10 g of acrylic polyol resin (ETERAC 7355-S-80), and 0.15 g of catalyst (DBTDL) were reacted at 80° C. for 5 hours and simultaneously distilled to remove some solvent, thereby obtaining an organic-inorganic hybrid resin with a solid content of 58.0%, a silicon spectrum signal integral value ratio $(3T^0+2T^1+T^2)/T^3$ of 0.74, a weight average molecular weight of 6587, and an excellent stability after standing at room temperature for 14 days.

2 g of crosslinker (Allnex cymel 1158) and 2 g of TiO$_2$ (Chemours R706) were added to 11 g of the organic-inorganic hybrid resin and mixed. The mixture was coated onto a galvanized steel plate, and then dried at 240° C. for 10 minutes to obtain a coating layer. The brightness retention rate of the coating layer after the weather resistance test (600 hours) was >85%.

Example 4

5 g of the polysilsesquioxane polymer synthesized from Example 1, 10 g of acrylic polyol resin (ETERAC 7355-S-80), and 0.15 g of catalyst (DBTDL) were reacted at 80° C. for 2 hours and simultaneously distilled to remove some solvent, thereby obtaining an organic-inorganic hybrid resin with a solid content of 35.0%, a weight average molecular weight of 4550, and an excellent stability after standing at room temperature for 14 days.

2 g of crosslinker (Allnex cymel 1158) and 2 g of TiO$_2$ (Chemours R706) were added to 11 g of the organic-inorganic hybrid resin and mixed. The mixture was coated onto a galvanized steel plate, and then dried at 240° C. for 10 minutes to obtain a coating layer. The brightness retention rate of the coating layer after the weather resistance test (600 hours) was about 80%.

Comparative Example 1

40 g of the polysilsesquioxane polymer synthesized from Example 1, 5 g of acrylic polyol resin (ETERAC 7355-S-80), and 0.15 g of catalyst (DBTDL) were mixed, thereby obtaining an organic-inorganic hybrid resin with a solid content of 51.5%, a silicon spectrum signal integral value ratio $(3T^0+2T^1+T^2)/T^3$ of 1.98, and a poor stability (e.g. gel) after standing at room temperature for 14 days.

2 g of crosslinker (Allnex cymel 1158) and 2 g of TiO$_2$ (Chemours R706) were added to 11 g of the organic-inorganic hybrid resin and mixed. The mixture was coated onto a galvanized steel plate, and then dried at 240° C. for 10 minutes to obtain a coating layer. The brightness retention rate of the coating layer after the weather resistance test (600 hours) was >85%.

Comparative Example 2

40 g of the polysilsesquioxane polymer synthesized from Example 1, 5 g of acrylic polyol resin (ETERAC 7355-S-80), and 0.15 g of catalyst (DBTDL) were reacted at 80° C. for 2 hours (without being distilled to remove some solvent), thereby being gelled and could not be used.

Comparative Example 3

40 g of the polysilsesquioxane polymer synthesized from Example 1, 10 g of acrylic polyol resin (ETERAC 7355-S-80), and 0.15 g of catalyst (DBTDL) were mixed, thereby obtaining an organic-inorganic hybrid resin with a solid content of 53%, a silicon spectrum signal integral value ratio $(3T^0+2T^1+T^2)/T^3$ of 2.13, and a poor stability (e.g. having suspended matter) after standing at room temperature for 14 days.

2 g of crosslinker (Allnex cymel 1158) and 2 g of TiO$_2$ (Chemours R706) were added to 11 g of the organic-inorganic hybrid resin and mixed. The mixture was coated onto a galvanized steel plate, and then dried at 240° C. for 10 minutes to obtain a coating layer. The brightness retention rate of the coating layer after the weather resistance test (600 hours) was >85%.

Comparative Example 4

40 g of the polysilsesquioxane polymer synthesized from Example 1, 10 g of acrylic polyol resin (ETERAC 7355-S-80), and 0.15 g of catalyst (DBTDL) were reacted at 80° C. for 2 hours (without being distilled to remove some solvent), thereby being gelled and could not be used.

Comparative Example 5

14 g of acrylic polyol resin (ETERAC 7355-S-80, weight average molecular weight was about 4000, solid content was 80%) had an excellent stability after standing at room temperature for 14 days.

2 g of crosslinker (Allnex cymel 1158) and 2 g of TiO$_2$ (Chemours R706) were added to 14 g of the acrylic polyol resin (ETERAC 7355-S-80) and mixed. The mixture was coated onto a galvanized steel plate, and then dried at 240° C. for 10 minutes to obtain a coating layer. The brightness retention rate of the coating layer after the weather resistance test (600 hours) was 40%.

Comparative Example 6

11 g of the polysilsesquioxane polymer synthesized from Example 1 had a solid content of 36.6%, a silicon spectrum signal integral value ratio $(3T^0+2T^1+T^2)/T^3$ of 2.49, a weight average molecular weight of about 2000, and a poor stability (e.g. gel) after standing at room temperature for 14 days.

2 g of crosslinker (Allnex cymel 1158) and 2 g of TiO$_2$ (Chemours R706) were added to 11 g of the polysilsesquioxane polymer synthesized from Example 1 and mixed. The mixture was coated onto a galvanized steel plate, and then dried at 240° C. for 10 minutes to obtain a coating layer. The brightness retention rate of the coating layer after the weather resistance test (600 hours) was >85%.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. An organic-inorganic hybrid resin, being:
   formed by reacting a polyol organic resin with a polysilsesquioxane polymer,
   wherein the organic-inorganic hybrid resin has $T^0$, $T^1$, $T^2$, and $T^3$ signals of $^{29}$Si-NMR, wherein a ratio of the sum of 3 times the integral value of $T^0$ signal and 2 times the integral value of $T^1$ signal and the integral value of $T^2$ signal to the integral value of $T^3$ signal $((3T^0+2T^1+T^2)/T^3)$ is from 0.3 to 1.2,
   wherein the $T^0$ signal range is 35 ppm to 40 ppm;
   the $T^1$ signal range is 48 ppm to 53 ppm;
   the $T^2$ signal range is 55 ppm to 62 ppm; and
   the $T^3$ signal range is 63 ppm to 72 ppm.

2. The organic-inorganic hybrid resin as claimed in claim 1, wherein the polysilsesquioxane polymer and the polyol organic resin have a weight ratio of 12:1 to 0.2:1.

3. The organic-inorganic hybrid resin as claimed in claim 1, wherein the polyol organic resin comprises acrylic polyol resin, polyester polyol resin, polycarbonate polyol resin, or polyether polyol resin.

4. The organic-inorganic hybrid resin as claimed in claim 1, having a weight average molecular weight of 3000 to 30000.

5. A coating material, comprising:
   1 part by weight of an organic-inorganic hybrid resin and 0.2 to 1.5 parts by weight of solvent,
   wherein the organic-inorganic hybrid resin is formed by reacting a polyol organic resin with a polysilsesquioxane polymer,
   wherein the organic-inorganic hybrid resin has $T^0$, $T^1$, $T^2$, and $T^3$ signals of $^{29}$Si-NMR, wherein a ratio of the sum of 3 times the integral value of $T^0$ signal and 2 times the integral value of $T^1$ signal and the integral value of $T^2$ signal to the integral value of $T^3$ signal $((3T^0+2T^1+T^2)/T^3)$ is from 0.3 to 1.2,
   wherein the $T^0$ signal range is 35 ppm to 40 ppm;
   the $T^1$ signal range is 48 ppm to 53 ppm;
   the $T^2$ signal range is 55 ppm to 62 ppm; and
   the $T^3$ signal range is 63 ppm to 72 ppm.

6. The coating material as claimed in claim 5, wherein the solvent comprises ethyl acetate, butyl acetate, ethanol, isopropanol, butanol, methyl isobutyl ketone, acetone, toluene, xylene, aromatic naphtha, tetrahydrofuran, cyclohexane, or cyclohexanone.

7. The coating material as claimed in claim 5, further comprising a crosslinker, inorganic filler, or a combination thereof.

8. A composite structure, comprising:
   a metal substrate; and
   a coating layer disposed on the metal substrate,
   wherein the coating layer is formed by curing a coating material, the coating material includes an organic-inorganic hybrid resin, and the organic-inorganic hybrid resin is formed by reacting a polyol organic resin with a polysilsesquioxane polymer,
   wherein the organic-inorganic hybrid resin has $T^0$, $T^1$, $T^2$, and $T^3$ signals of $^{29}$Si-NMR, wherein a ratio of the sum of 3 times the integral value of $T^0$ signal and 2 times the integral value of $T^1$ signal and the integral value of $T^2$ signal to the integral value of $T^3$ signal $((3T^0+2T^1+T^2)/T^3)$ is from 0.3 to 1.2, wherein the $T^0$ signal range is 35 ppm to 40 ppm;
the $T^1$ signal range is 48 ppm to 53 ppm;
the $T^2$ signal range is 55 ppm to 62 ppm; and
the $T^3$ signal range is 63 ppm to 72 ppm.

9. The composite structure as claimed in claim 8, wherein the coating material further comprises crosslinker, inorganic filler, or a combination thereof.

10. The composite structure as claimed in claim 8, wherein the coating layer has a thickness of 5 micrometers to 100 micrometers.

11. The composite structure as claimed in claim 8, further comprising a metal coating disposed between the metal substrate and the coating layer.

12. The composite structure as claimed in claim 8, further comprising a primer disposed between the metal substrate and the coating layer.

* * * * *